Dec. 27, 1932.  A. DO-HUU CHAN  1,892,458
PROCESS AND APPARATUS FOR THE MANUFACTURE OF GLASS
Filed Nov. 18, 1930  2 Sheets-Sheet 1
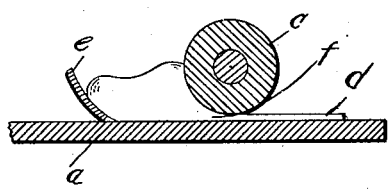
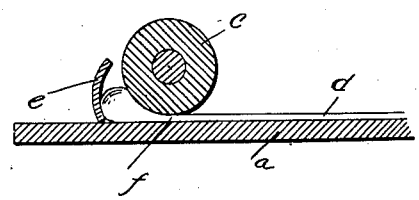
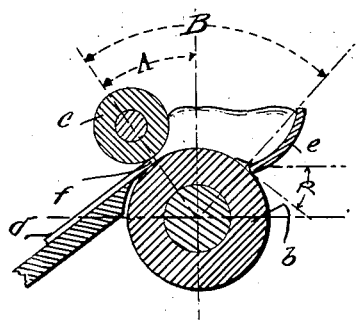
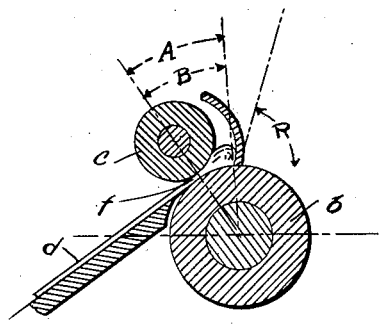
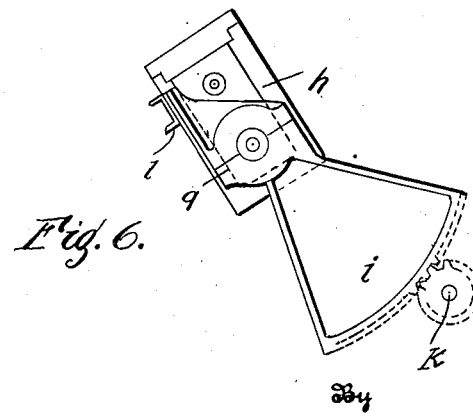
Inventor
Andre Do-Huu Chan, Inventor
Andre Do-Huu Chan Patented Dec. 27, 1932

1,892,458

UNITED STATES PATENT OFFICE

ANDRÉ DO-HUU CHAN, OF CIREY-SUR-VEZOUZE, FRANCE, ASSIGNOR TO SOCIÉTÉ ANONYME DES MANUFACTURES DES GLACES & PRODUITS CHIMIQUES DE SAINT GOBAIN, CHAUNY & CIREY, OF PARIS, FRANCE

PROCESS AND APPARATUS FOR THE MANUFACTURE OF GLASS

Application filed November 18, 1930, Serial No. 496,529, and in France November 28, 1929.

The prior intermittent processes for manufacturing glass sheets generally included the formation of a mass of glass by pouring the glass from a ladle or from a melting pot adjacent to a forming pass, through which pass the glass was fed to reduce it to sheet form.

This invention is directed to maintaining such mass in a desirable shape, both prior to the commencement of the sheet forming operation and during the same and for these purposes contemplates varying the area to be covered by the mass in accordance with the amount of glass initially in each mass and with the reduction in amount as the sheet is formed therefrom, and restraining the spread of the mass rearwardly by walls which at different successive times in the working of the mass are so inclined as to give the best results. For these purposes it comprises the methods of handling the glass and the several instrumentalities therefor hereinafter described and claimed.

Referring to the accompanying drawings in which corresponding parts are designated by similar marks of reference.

Figs. 1 and 2 are diagrammatic views representing initial and final stages in the formation of a sheet of glass by my invention when the sheet is produced by the roll and table process.

Figs. 3 and 4 are corresponding views representing my invention when the sheet is formed by the two-roll process.

Fig. 6 is a side view of the machine of Fig. 5, with the frame removed.

My invention, as shown in Figs. 1 and 2, is applicable to the roller and table process and in these figures $a$ represents the usual casting table and $c$ represents the roll cooperating therewith with a pass $f$ between the two at which the sheet $d$ is formed from a mass of glass deposited on the table adjacent to the roll. To confine this mass of glass and limit the area over which it shall spread prior to its passage through the forming pass, I provide a wall $e$ having a curved face towards the roll to confine the mass. As shown in Fig. 1, this face inclines rearwardly, that being the natural shape assumed by the rear face of the glass mass as it spreads on the table in its flow or settling. As the mass feeds beneath the roller $c$ the natural shape of this rear face changes, and I therefore change the inclination of the wall and move it towards the roll as the mass of glass diminishes (see Fig. 2).

The application of this invention to the two-roll system in which the glass mass is deposited on the lower roll, is shown in Figs. 3 and 4. Here the lower roll is marked $b$, the upper roll and wall being marked with the same reference letters as in Figs. 1 and 2.

Figure 5:
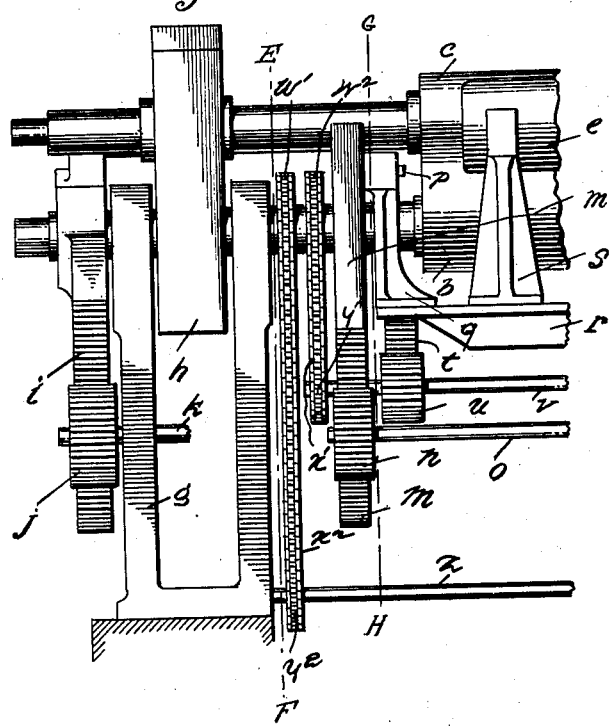
Fig. 5 is a partial rear elevation of a machine for carrying out the process of Figs. 3 and 4 and embodying my invention.
Figure 7:
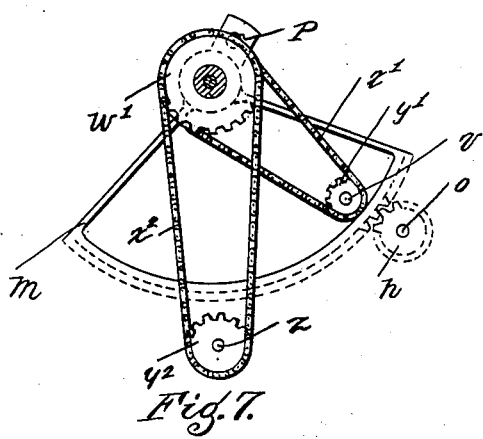
Fig. 7 is a detail in vertical section on the line E—F of Fig. 5.
Figure 8:
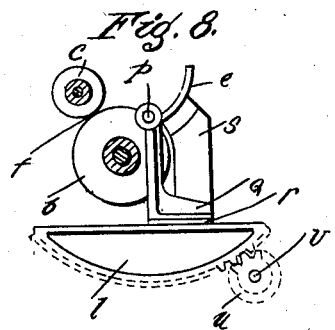
Fig. 8 is a similar view on the line G—H.

In the type of apparatus here shown in Figs. 3 and 4 it is desirable to change the inclination of the line of centers of the rolls $c$ and $b$ with the vertical, in accordance with the viscosity of the glass, thickness of the sheet to be made, etc. To permit this without destroying the proper separation between the upper roll and the limiting wall, as well as to permit the proper movement of the limiting wall towards the upper roll, and to permit variation in the inclination of the movable wall, I prefer to provide a construction such as shown in Figs. 5, 6, 7 and 8, by which the angle A (i. e., the angle between the line of centers of the rolls $b$ and $c$ and the vertical); the angle B (i. e., the angle between the line of centers and the lower edge of the limiting wall); and the angle R (i. e., the angle between the lower glass contacting surface of the limiting wall and the tangent to the roll $b$ at the point of contact) may be each varied during the operation of the machine.

The roll $b$ is carried at each end in a split standard $g$ and in the fork of each standard a frame $h$ is sleeved on the axis of such roll, the frames $h$ carrying in their upper end the axis of the upper roll $c$. On the axis of the roll $b$ at each end thereof is sleeved the toothed sector $i$, the two sectors $i$ and the two frames $h$ being connected together by the cross-bar $l$. A pinion $j$ on a shaft $k$ meshes with the sector $i$ and thus provides a means whereby the angle A above referred to may be varied.

On each end of the axis of the roll $b$ inside of the standards $g$, is mounted a sector $m$ gearing with a pinion $n$ on a shaft $o$. Each toothed sector $m$ carries on an upward extension thereof a stud $p$ at a distance from its center of movement around the axis of the roll $b$ equal to the radius of such roll.

Brackets $q$ are swivelled on the studs $p$ and are connected by the crossbar $r$, from which rises the standards $s$ carrying and supporting the movable limiting wall $e$, the lower edge of the wall being in the line joining the studs $p$. Hence, by means of the pinion $n$ the angle B, before referred to, may be varied and this without affecting the angle R.

Carried by the cross member $r$ is the sector $t$ meshing with the pinion $u$ fixed on the shaft $v$ which has its bearings mounted in the sectors $m$. The drive for the shaft $v$ is effectuated from the shaft $z$ by the drive wheels $y^1$ on the shaft $v$ and $y^2$ on the shaft $z$ through the sprocket chains $x^1$ and $x^2$, and the twin sprockets $w^1$ and $w^2$ mounted loose on the trunnions of the roll $b$. By the rotation of the shaft $v$, the toothed sectors $t$, cross bar $r$, standards $s$, brackets $q$ effect rotation of the stop bar $e$ about the axis of the studs $p$ and vary the angle R above referred to.

Each of the shafts $k$, $o$ and $z$ may be independently driven by hand or by separate motors, as may be desired. Also, if desired, magnetic brakes and clutches may be mounted on the shafts $z$ and $v$ to prevent rotation of the shaft $v$, due to planetary movement, when the shaft $o$ is rotated without rotating the shaft $z$.

Having thus described my invention what I claim as new and desire to secure by United States Letters Patent, is:

1. The combination in a sheet forming machine of a forming pass, and a glass receiving surface adjacent thereto, a movable retaining wall, and means for varying the position of the wall in respect to the forming pass and inclination of the said wall in respect to the receiving surface.

2. In a sheet glass forming machine the combination with a pair of rolls having a forming pass therebetween, of means for varying the inclination of the line of centers of the two rolls, a glass retaining wall mounted for movement around the axis of the lower roll, and means for so moving said wall, and for varying the inclination of the glass contacting edge of the said walls in respect to the tangent of the lower roll at its point of contact therewith.

3. In a sheet glass forming machine the combination with a pair of rolls having a forming pass between them, of means for changing the inclination of the line of centers of the two rolls, a wall mounted for movement around an axis located at its lower edge, supports on which the limiting wall is mounted for such movement and movable around the axis of the lower roll at a radius equal to the radius of such roll, and means for independently moving the supports in their path of movement and for swinging the limiting wall around its axis.

4. The hereinbefore described method of feeding glass to a forming pass from a mass poured on a bed moving towards said pass, which comprises feeding the glass to the pass by the movement of the bed while limiting the rearward flow of the mass by a wall conforming in curvature to the curvature of the rear surface of the mass as determined by the drag exerted on the bottom of the glass by the movement of the bed, and progressively varying the inclination of the wall to conform to the curvature of the rear surface of the mass as the mass is reduced by working

ANDRÉ DO-HUU CHAN.